United States Patent [19]

Takayanagi

[11] Patent Number: 5,251,297
[45] Date of Patent: Oct. 5, 1993

[54] PICTURE IMAGE PROCESSING SYSTEM FOR ENTERING BATCHES OF ORIGINAL DOCUMENTS TO PROVIDE CORRESPONDING PICTURE IMAGE DATAFILES

[75] Inventor: Hiroshi Takayanagi, Kanagawa, Japan

[73] Assignee: Fuji Xerox Co., Ltd., Tokyo, Japan

[21] Appl. No.: 595,220

[22] Filed: Oct. 10, 1990

[51] Int. Cl.$^5$ ............................................. G06F 15/20
[52] U.S. Cl. .................................... 395/164; 395/162; 358/296; 358/403; 355/200; 345/203
[58] Field of Search ............................... 395/162-164; 340/798-800; 358/296, 403, 437, 448; 355/311, 200

[56] References Cited

U.S. PATENT DOCUMENTS 4,485,411 11/1984 Yamamoto .......................... 358/296
5,097,341 3/1992 Forest ................................. 358/296

*Primary Examiner*—Dale M. Shaw
*Assistant Examiner*—Kee M. Tung
*Attorney, Agent, or Firm*—Finnegan, Henderson, Farabow, Garrett & Dunner

[57] ABSTRACT

A system capable of compensating for the shortage of storage capacity by deleting stored picture image datafiles as appropriate from time to time on the basis of such factors as the degree of importance of each file, the lapse of time since the creation of each stored file, and the effective residual storage capacity for the image files.

24 Claims, 6 Drawing Sheets

```
                    JOB CONTROL SHEET
        PLEASE PAINT OUT THE REQUIRED ITEMS WITH A PENCIL

■ PAPER SIZE        ○ B5    ○ A4    ○ B4    ○ A3

■ NUMBER OF COPIES : DIGIT FOR 10
                    ① ② ③ ④ ⑤ ⑥ ⑦ ⑧ ⑨ ⑩
■ NUMBER OF COPIES : DIGIT FOR 1
                    ① ② ③ ④ ⑤ ⑥ ⑦ ⑧ ⑨

AFTER TREATMENT    ○ RDH      ○ STABLE    ○ PASTING

■ MAGNIFICATION FOR MANUAL ADJUSTMENT  ○

■ MAGNIFICATION % : DIGIT FOR 100
                    ① ② ③ ④
■ MAGNIFICATION % : DIGIT FOR 10
                    ① ② ③ ④ ⑤ ⑥ ⑦ ⑧ ⑨ ⑩
■ MAGNIFICATION % : DIGIT FOR 1
                    ① ② ③ ④ ⑤ ⑥ ⑦ ⑧ ⑨

■ DATA SAVING AFTER COPYING  ○

■ SAVE LEVEL    ① UNLIMITED PERIOD    ② IMPORTANT

ANY NUMERAL NOT PAINTED OUT WILL BE READ AS "0"
```

FOMAT SHEET READING CIRCUIT

PICTURE IMAGE PROCESSING SYSTEM FOR ENTERING BATCHES OF ORIGINAL DOCUMENTS TO PROVIDE CORRESPONDING PICTURE IMAGE DATAFILES

BACKGROUND OF THE INVENTION

1. Field of the Invention

The present invention relates to a picture image processing system of the picture image storage type which temporarily stores and accumulates picture image data temporarily read into the system.

2. Discussion of the Belated Art

A picture image storage type electrophotographic copying machine is comprised of a reading device, a storage device, and a picture image output device, and offers many such functions as electronic RDH (Recirculating Document Handler), reverse sequence output, and sample copying. Picture images (original documents) need be read only once by a reading device, such as a digital raster scanner, and then stored in picture image files with associated job parameters. The job parameters are operating instructions for the picture image processing system and include instructions on such items as the paper size and paper orientation, the number of pages, the number of chromatic grades or shades, colors, binding margin, and photographic modes. (The operating instructions will be sometimes referred to as "the parameters" in this specification.) The storage device may be a hard disk from which picture images may be read and printed in a regular sequence.

This type of system enables the operator to obtain a sample copy for confirmation of the contents and then to produce large quantities of copies, with corrections made as necessary, and also to have the equipment read and store parts of an original document in advance, to expedite subsequent processing operations, even if all of the sheets of the original document are not ready.

Highly dense images generate picture image data in an enormous amount, e.g., up to four megabytes for a single sheet of binary picture images with 600 by 600 dpi on a standard A-4 size sheet. Even if the picture image data is compressed, the amount of picture image data may be as large as several hundred kilobytes. Conventional picture image processing systems, such as the electrophotographic copying machine mentioned above, has had the shortcoming that the system will not have sufficient storage capacity in the hard disk for a sufficient number of documents.

SUMMARY OF THE INVENTION

The present invention has been made in view of the above circumstances and has an object a picture image processing system capable of maximizing the utilization of the effective residual storage capacity in the storage device on the basis that the relative importance of the picture image datafiles stored in a picture image processing system is less than that of datafiles inputted into a computer system because the original documents for such picture image files are generally stored separately.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In order to achieve the objects set forth hereinabove and in accordance with the purpose of the invention as embodied and broadly described herein, the picture image processing system according to the present invention comprises: means for storing the picture image datafiles; means for assigning a storage retention priority to each of said stored picture image datafiles, said storage retention priority being one of a plurality of levels from a highest retention priority to a lowest retention priority; means responsive to an application of power to the image processing system for identifying said image datafiles having the lowest retention priority.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE INVENTION

The picture image processing system of the present invention outputs picture image datafiles created from optically scanning picture images. Picture image processing operations are performed in the picture image processing unit on the basis of job parameters, which are operating instructions for execution by the picture image processing system.

The picture image processing system has a picture image processing unit comprising a storing means for temporarily storing and accumulating input data and job parameters. A set value deciding means for deciding whether the job parameters are within set values, and a deleting means for selectively deleting picture image datafiles and any given job parameters from the storing means when the set value deciding means has decided that additional storage space is required on the disk.

The picture image processing system according to the present invention converts the picture image datafiles into digital signals in accordance with the job parameters. The converted data representing an original document or the like is stored and can be outputted from time to time in accordance with the parameters corresponding to the particular original document. In case the job parameters exceed set values, the system deletes the associated picture image datafiles when necessary to secure more storage capacity in the storing means. In this process, the system deletes a picture image datafile in the storage means on the basis of a save level code set up in accordance with the degree of importance of each picture image datafile.

Figure 1:
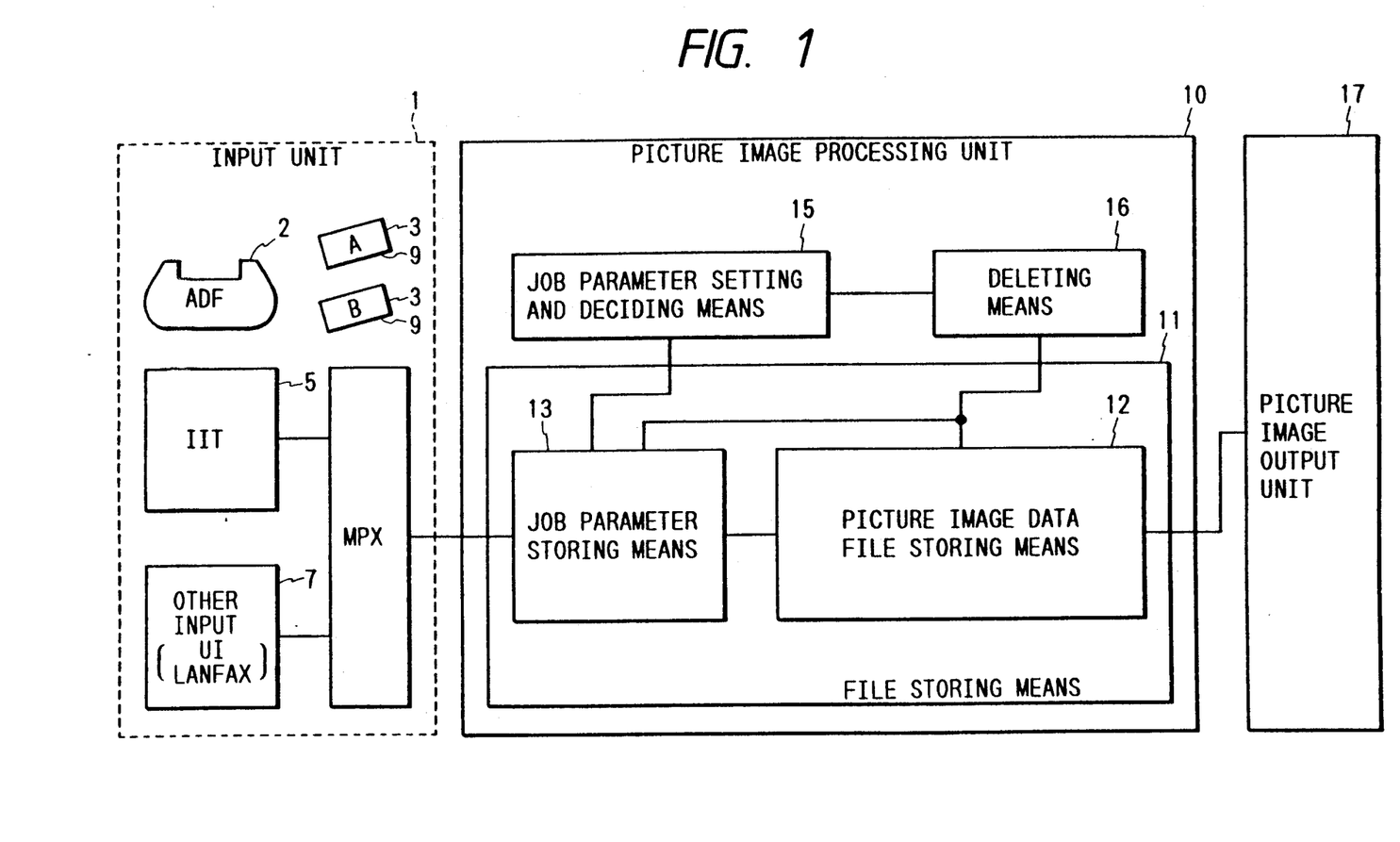
FIG. 1 is a conceptual drawing of the overall configuration of the picture image processing system according to the present invention.

FIG. 1 is a conceptual drawing of the overall configuration of an electrophotographic copying machine.

In FIG. 1, batch A, batch B, and so forth, are stacks of sheets of an original document 3 which are set in an automatic document feeder (ADF) 2 in an input unit 1. Picture image data representing the original document 3 is outputted by an image input terminal (IIT) 5 that scans the documents, and is stored in a picture image datafile storing means 12 comprised of a hard disk and an image drawing memory device. A job control sheet 9, on which some of the job parameters (such as the size and orientation of the paper, the number of pages, the number of chromatic grades, colors, binding margin, photographic mode, and a save level code indicating the degree of importance of the associated original document) is placed as the front page of each of batch A and batch B. Batch A and batch B contains one or more sheets of an original document 3 associated with their respective control sheets 9.

The parameters are stored in a job parameter storing means 13, which may comprise a random access memory device (RAM). Items such as the time when the particular picture image datafile was created are also written into the job parameter storing means 13. The picture image datafiles are created by optically scanning the respective original documents 3 in batch A and batch B in accordance with the associated sets of parameters. An original document 3 that does not have any job control sheet 9, however, can first be read into the system by means of the Image Input Terminal (IIT) 5 (a digital roster scanner), with the original document 3 fed via the automatic document feeder (ADF) 2. The associated job parameters can be set for particular document through a user interfaces (UI) 6, which includes a control panel, a display, a keyboard, and a mouse.

Figure 2:
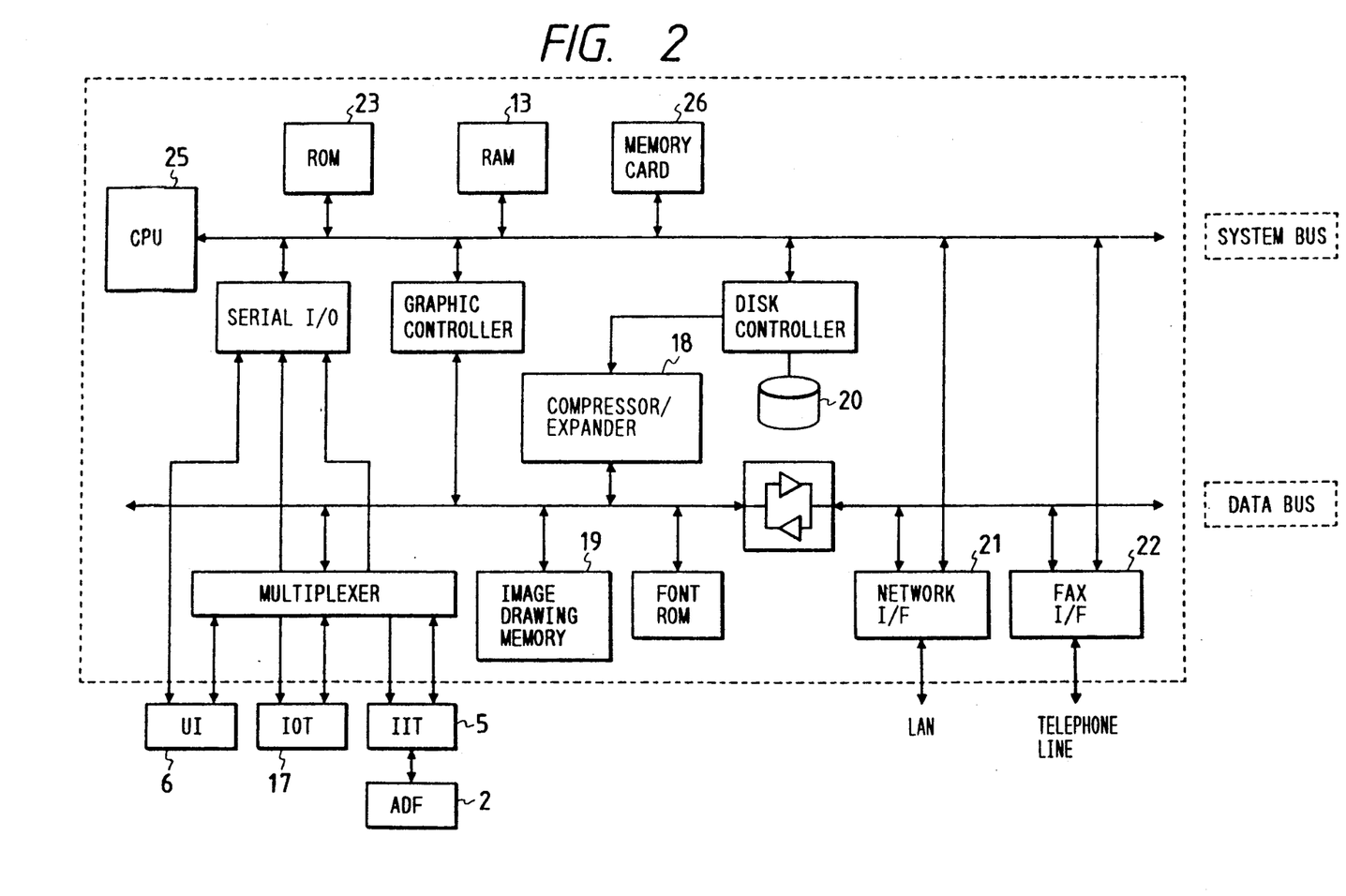
FIG. 2 is a block diagram relating to the control of the picture image processing system according to the present invention.

The input unit 1 is comprised of the user interfaces (UI) 7 for this copying machine and also other picture image processing units such as a personal computer system connected to the system via a network (LAN) and a facsimile machine connected by a telephone line (FIG. 2).

The picture image data read into the system in this manner are edited as appropriate in the picture image processing unit 10 and stored temporarily in the form of picture image datafiles in the picture image datafile storing means 12. A picture image datafile can be outputted repeatedly to generate a required number of copies by the picture image output unit 17. Also, depending on the circumstances, a picture image datafile may be outputted to another picture image processing unit via a network line LAN or a telephone line (FIG. 2).

After a picture image datafile is outputted, the stored picture image datafile in the picture image datafile storing means 12 may be deleted as a general rule. Normally when a job parameter setting and deciding means 15 determines from the job parameters that the job has been completed, a deleting means 16 will delete the picture image datafile in the picture image datafile storing means 12 and the parameters in the job parameter storing means 13. However, depending on the job parameters, a picture image datafile may not be deleted immediately after the picture images are outputted.

In this regard, the job parameter setting and deciding means 15 may comprise a timer, a counter, a comparator, and so forth (not illustrated in the Figure) in the CPU 25 (FIG. 2), and the deleting means 16 may include a CLEAR command output from the CPU 25.

FIG. 2 presents a detailed block diagram relating to the control of the picture image processing unit 10 in the picture image processing system according to the present invention. The original document 3 and the job control sheet 9, which are fed by the automatic document feeder (ADF) 2, are read by the IIT 5. In this process, the job parameters indicated on the job control sheet 9 and the picture image data on the original documents 3 are distinguished by the IIT 5 and stored in the appropriate memory means. The job parameter data are inputted to the RAM 13, and, in accordance with those job parameters, the picture image data are stored in a 600K byte image drawing memory device 19. The job parameter data, including picture image data configuration items, such as the number of pages and the resolution, the number of chromatic grades, and the presence or absence of color, and so forth for each page, are correlated with the picture image datafile. Page sizes, the numbers of significant bits or the numbers of bytes in the fast scanning direction and in the slow scanning direction, the setting or non-setting of the photographic mode, the data and time when the datafile is created are compiled into encoded information and recorded along with the associated picture image datafile.

The picture image data, as modified by the parameters of the job parameter data in the 600K byte image drawing memory device 19, are stored in a hard disk 20 with a capacity of, for example, 100 megabytes, via a data compressing and expanding block 18. The picture image data are first developed in the image drawing memory device 19 and thereafter written to the hard disk 20 for several reasons. First, the image drawing memory device 19 is employed for editing the picture image data read via the ADF 2, the input data from the UI 6, and the external input data from a facsimile machine, a computer, or the like. Also, the picture image data are compressed in a variable ratio. The image drawing memory device 19 first checks to see how much memory capacity is available for storing the compressed picture image datafile, and then the compressed picture image datafile is stored in vacant areas on the hard disk 20.

Generally, a picture image datafile stored on the hard disk 20 will be deleted together with the parameters after it is used to produce the required number of printed copies of the original batch of documents in order to complete a processing job. That is, the picture image datafile will be deleted when operations specified by the associated parameters, such as electronic document recirculating, enlargement or reduction by a specified ratio, copying to produce a specified number of copies, a simplex or duplex copying, stapling, binding, and the like, are performed on the basis of the job parameters. This file should not be deleted, however, if it is not fully executed such as in the case where a few number of copies are first printed for a preliminary check on the contents prior to printing the file on a large number of copies. The file should not be deleted when it is likely to do so would lead to the trouble of reinputting the original document.

In this system, it is possible to receive picture image data and to transmit picture image data to an outside system, via a LAN (local area network) or a telephone line through a network interface 21 and facsimile interface 22, respectively. Personal computers, workstations, other copying machines, and the like, may be connected to the LAN line or the telephone line.

It is also sometimes necessary to display the picture image data on a cathode ray tube (CRT) at the time that the data is being inputted, for example, from a control panel (not illustrated in the Figure) provided with a CRT in this picture image processing system.

The control procedure described hereinabove is executed under the control of the CPU 25 in accordance with the control programs stored in the ROM 23. In this regard, a memory card 26 may also be used for storing job parameters unique to a user.

Figure 3:
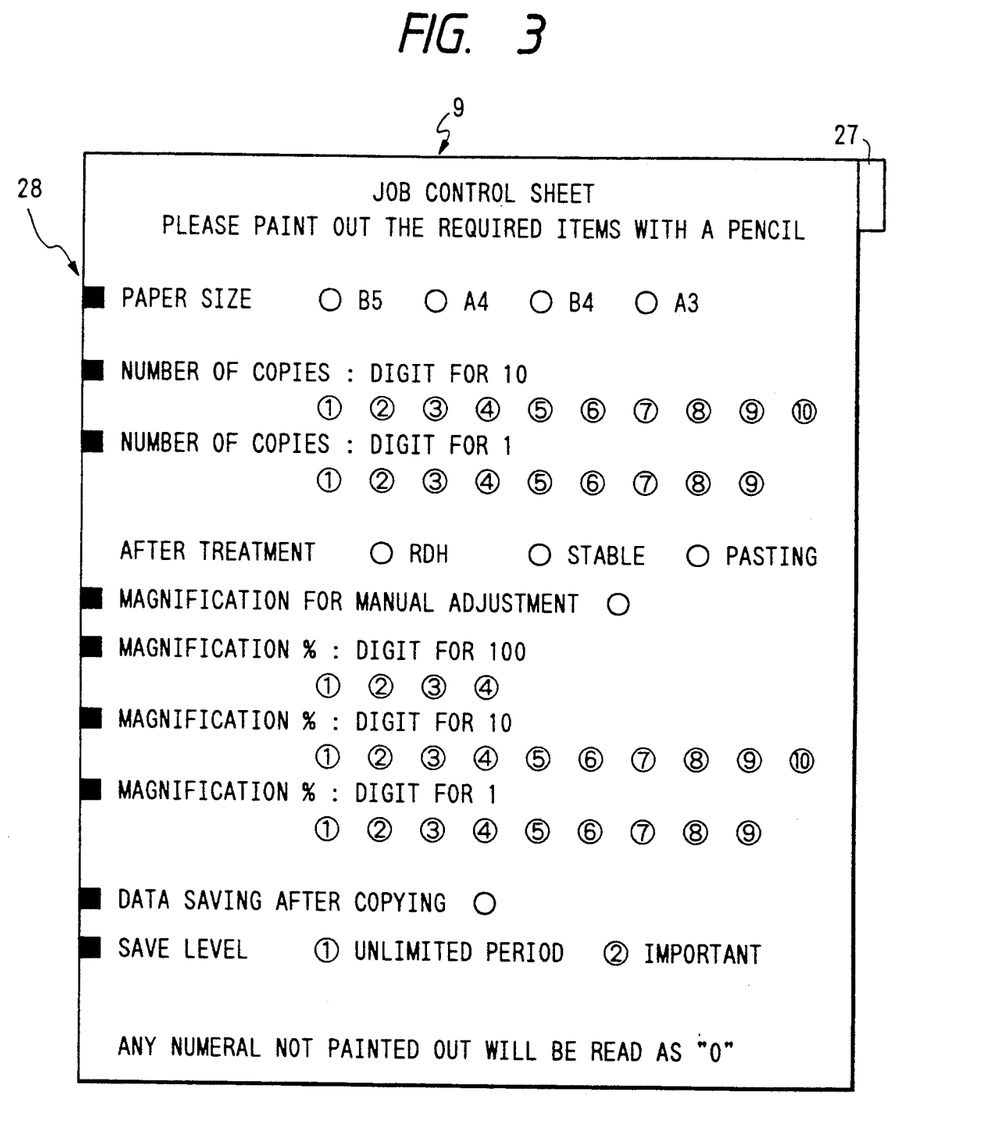
FIG. 3 illustrates a job control sheet.
Figure 4A:
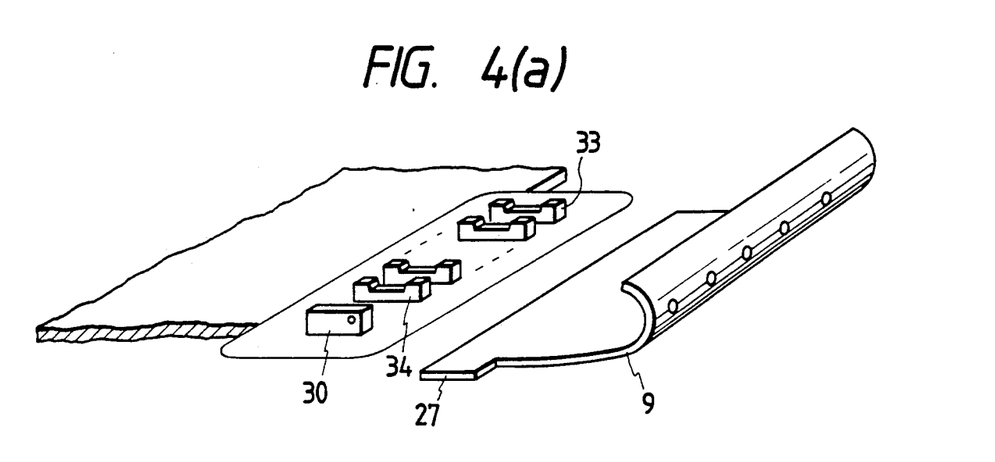
FIGS. 4(a) and 4(b) respectively illustrate in partial cut away the principal parts of the read area of the job control sheet and a control circuit.
Figure 4B:
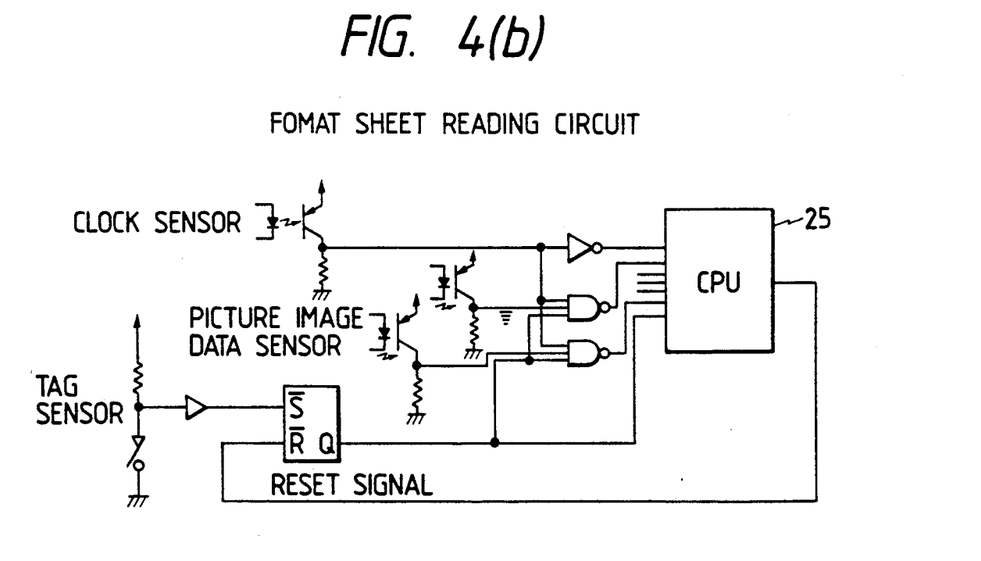

FIG. 3 illustrates an example of a job control sheet 9 that specifies the job parameters for picture image data. The individual parameters on the job control sheet 9 may be indicated by marking in pencil. Also, in order to distinguish data on the job control sheet 9 from ordinary picture image data, the control sheet is provided with a tag 27 protruding from the sheet 9 in the upper right corner. While the tag 27 may comprise a protrusion, it is also feasible to provide an area with a bar code to be read in a specified corner on the job control sheet 9. Moreover, a series of (timing) clock marks 28 is provided at the left end corresponding to the entry line for each job parameter. The clock marks 28 are used for synchronizing a reading sensor (FIG. 4) at the time that job parameter data is read by the IIT 5. Selected items of the job parameter can also entered through a keyboard after display on the display screen (not illustrated) of a CRT unit.

FIGS. 4(a) and 4(b) show the principal parts of the road area of the ITT 5 for reading the job control sheet 9, as well as a diagram for the reading circuit. In the ITT 5 illustrated in FIG. 4(a), the tag 27 protruding from the job control sheet 9 is read by the tag sensor 30 before the job control sheet 9 is fed to the platen glass 29 of the IIT 5.

In the job control sheet reading circuit shown in FIG. 4(b), a plurality of reading sensors 34 extend in a direction crossing at right angles with the direction of movement of the original document in the IIT 5 to read the individual job parameter data marked in pencil at the same time that a clock mark sensor 33 reads the clock marks 28 on the job control sheet 9 by the closing of a switch 31 on the tag sensor 30. This sets the flip-flop 32.

The CPU 25 writes the job parameter data to the RAM 13 (FIG. 2 and FIG. 5) and, depending on the circumstances, also to a memory card 26 to set the job parameters for processing of picture images of the associated batch of original documents 3.

Figure 5:
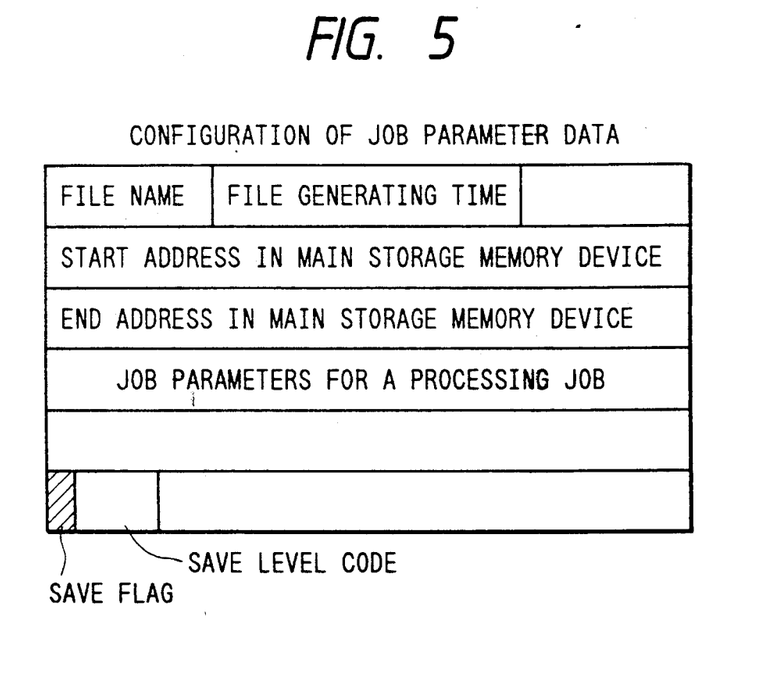
FIG. 5 illustrates a random access memory (RAM) used in the system of the present invention to store the parameters and so forth.

When the job control sheet 9 is discharged from the area on the platen glass 29 of the IIT 5, a reset signal is transmitted from the CPU 25 to the job control sheet reading circuit, and reading of the job control sheet 9 is finished. The job parameter data that are read are stored in the job parameter address in the RAM 13, as shown in FIG. 5. In this regard, each file of image data representing a batch of the original documents is given a datafile name at the time when the file is created. The datafile name is stored with the start address and end address of the associated picture image datafile for the particular original documents in a memory area for job parameter data on the hard disk. Moreover, a save flag and a cipher flag, which serve the purpose of retaining without deletion a stored datafile even after it is outputted by the picture image output unit 17, and a cipher (number) are stored. The datafile name for a batch of original documents may be inputted from the control panel, etc.

The job control sheet 9 has a save level column on it, and when a mark is entered in this column a save level corresponding a marked save code will be stored in the associated parameter area of the RAM 25. Level "1" represents "do not delete," and is normally assigned to regularly used forms, overlay forms, logomarks, and the like. Level "2" represents "important," which indicates that it would be a significant task to reinput the original document and that deletion of the picture image file should be avoided if possible. Typical level 2 documents include original documents having non-regular formats, original documents printed on thin paper, and original documents that are difficult to access. The user may decide at the save level to be given to a picture image datafile, and in case neither the level 1 nor the level 2 is marked, the save level of the file will default to level "3", which corresponds to the lowest degree of importance. In general, image datafiles are stored temporarily in the hard disk 20 and then deleted, but the system of the present invention permits the use to enter a save flag for each file.

When power is applied, the control circuit retrieves a list of the files of picture image data stored in the nonvolatile RAM 13 and deletes those files having a same level "3" from the storage device. This results in deletion of the associated picture image datafiles from the hard disk 20. The CPU 25 then starts normal processing operations.

If more picture image files are added to an extent that the effective storage usage, i.e. the working memory, of the hard disk 20 exceeds 50 percent of the memory capacity of the hard disk 20, a memory counter (not illustrated in the Figure) interrupts the operation of the CPU 25. Thereupon, the CPU 25 performs operations to delete files having save level 3 which have already been outputted in printed form and to delete files with save level 2 which were created more than a predetermined time period in the past, e.g., 24 hours, in order to secure additional working memory on the disk 20. If the usage level of the working memory increases to more than 70 percent of the memory capacity of the hard disk 20, the memory counter again interrupts the CPU 25. The CPU 25 then deletes all files with save level 3 or 2 and the level 2 to free up additional disk area.

In the example described above, the effective residual storage capacity of the hard disk 20 and the lapse of time from the time when a given picture image datafile is created on the hard disk 20 are taken as job parameters. It is also possible to use the number of pages printed by the output unit (Image Output Unit; IOT) 17 as a parameter instead of elapsed time from file creation. Moreover, the set value deciding means, which decides whether or not the picture image datafiles are to be deleted, is composed of a timer and a comparator (not illustrated in any Figure) in the example in which the elapsed time from creation is used as a job parameter, but would not be used if the number of pages printed is taken as a job parameter. In such a case, a printed page counter, which counts the number of sheets printed, (not illustrated in any Figure) and a comparator may be used. Moreover, the set value deciding means for the effective residual storage capacity of the hard disk is composed of a memory counter and a comparator.

The set value for deleting a file may be decided with reference to a table combining two or more of parameters such as elapsed time from creation, the number of printed sheets, and the effective residual storage capacity of the hard disk.

Figure 6:
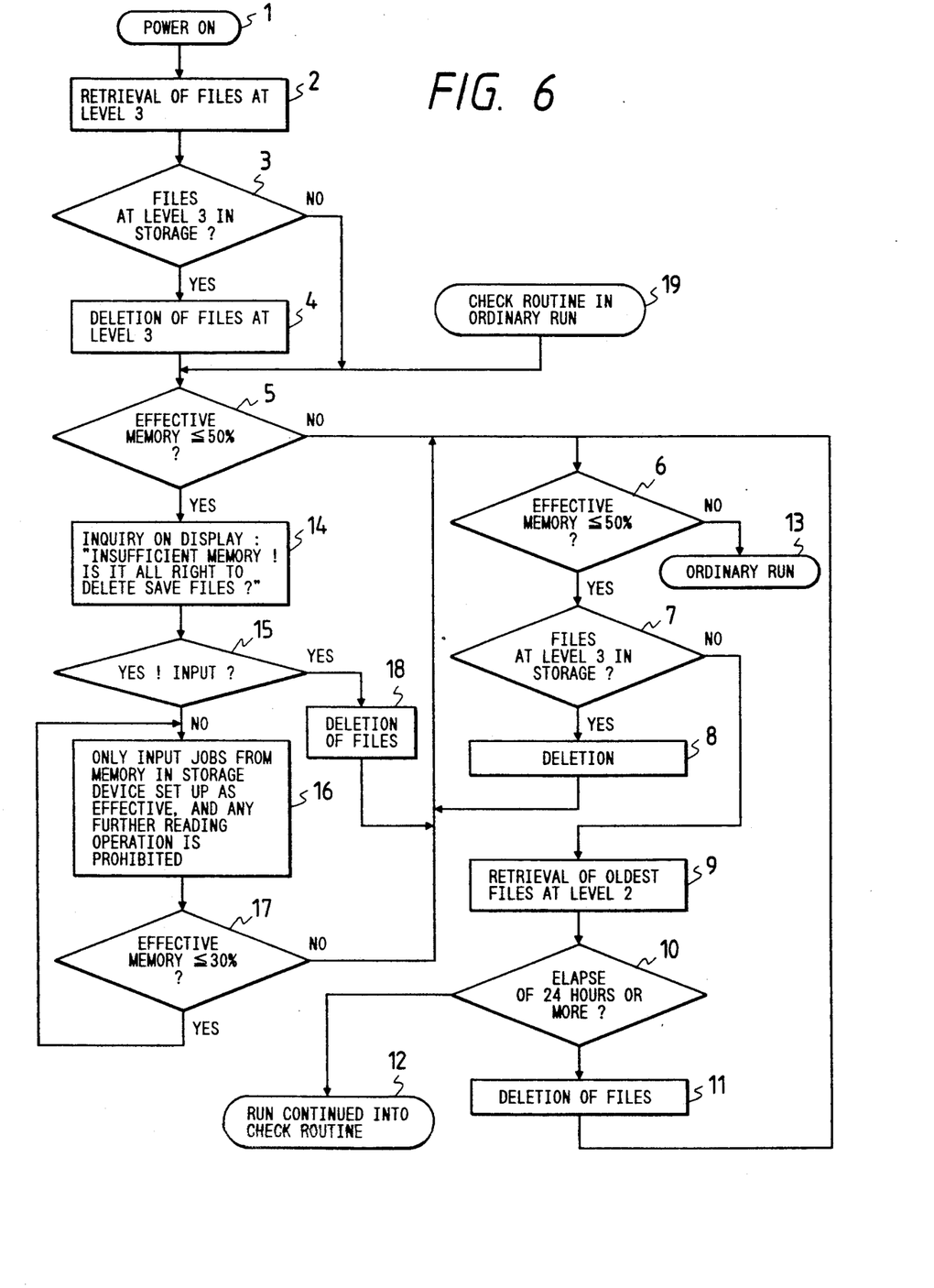
FIG. 6 is a flow chart showing the procedure for deleting a picture image datafile in the storing means in the system according to the present invention.

Next, an example of the saving procedure is described in detail with reference to the flow chart given in FIG. 6.

After power is applied to the system is turned on, the system retrieves and deletes the picture image datafiles at level 3. (Steps 2 and 3.) When the effective residual storage capacity in the hard disk 20 is not less than 50 percent, the system performs ordinary processing by which it temporarily stores the picture image datafiles in the hard disk 20. (Step 13.) When the effective residual storage capacity of the hard disk 20 is reduced to a level that is less than 50 percent of its capacity, the system deletes the picture image datafiles at level 3, if any are in storage (the Step 8). If no such files are stored, the system retrieves the picture image datafiles at level 2 (Step 9), and deletes the files based on the lapse of time since creation, i.e. the history of the picture image datafiles at the level 2 as written in the parameter area of the RAM 13.

In the preferred embodiment, the system deletes picture image datafiles at level 2 as mentioned above (Step 11), provided that 24 hours or more have elapsed since the file was created. The system maintains on the disk those picture image datafiles which have not been in existence for 24 hours, and returns to the check routine executed at the step 19 (Step 12).

If the effective residual storage capacity of the hard disk 20 is reduced to 30 percent or less, the system displays a message on the display unit to ask if all picture image datafiles, except those files with level 1, may be deleted. (Step 14.) If the system receives approval of such deletions, it deletes the particular picture image datafiles. If such deletions are not approved, the system prohibits the writing of new files to the hard disk 20 (Step 17) and proceeds to Step 6.

This example of preferred embodiments has been described with reference to a copying machine, but the present invention is applicable not only to a copying machines but also to other picture image processing equipment such as a printer.

As described hereinabove, the picture image processing system according to the present invention is capable of compensating for any insufficiency of storage capacity in the storing means by deleting picture image datafiles from the storing means in the regular order and sequence on the basis of their respective degrees of importance, the elapsed time since creation of the file, the effective residual storage capacity, and so forth even if the storage capacity of the storing means is limited when viewed in the relation to the large amount of picture image datafiles.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A picture image processing system for entering batches of original documents to provide corresponding picture image datafiles corresponding to each of the batches of original documents comprising:
   means for storing the picture image datafiles;
   means for assigning a storage retention priority to each of said stored picture image datafiles, said storage retention priority being one of a plurality of levels from a highest retention priority to a lowest retention priority;
   means responsive to an application of power to the image processing system for identifying said image datafiles having the lowest retention priority; and
   deleting means for deleting from said storing means said picture image datafiles identified by said identifying means as having the lowest retention priority.

2. A picture image processing system according to claim 1, wherein said assigning means comprises a job control sheet associated with each of the batches of documents, said job control sheet including a retention priority field for indicating the storage retention priority of the picture image datafile corresponding to the batch of original documents associated with said job control sheet.

3. A picture image processing system according to claim 2, further including an optical scanner for scanning the batches of original documents to generate the associated picture image datafiles and the job control sheets corresponding to said scanned batches of original documents to generate a batch parameter file associated each of said picture image datafiles.

4. A picture image processing system according to claim 3, further including means for storing in said batch parameter file associated with each of the picture image datafiles a file creation time corresponding to the time that the associated picture image datafile was first stored in the storing means and a number of sheets of the associated picture image datafile that have been printed by an output printing means, and wherein said deleting means further deletes picture image datafiles having a selected priority from the storing means based on any one of said file creation time and the number of sheets of the associated picture image datafile printed by the output printing means.

5. A picture image processing system according to claim 3, further including means for storing in said batch parameter file associated with each of the picture image datafiles a file creation time corresponding to the time that the associated picture image datafile was first stored in the storing means, and wherein said deleting means further deletes picture image datafiles having a selected priority from the storing means based on said file creation time.

6. A picture image processing system according to claim 3, further including means for storing in said batch parameter file associated with each of the picture image datafiles the number of sheets of the associated picture image datafile that have been printed by an output printing means, and wherein said deleting means further deletes picture image datafiles having a selected priority from the storing means based on the number of sheets of the associated picture image datafiles printed by the output printing means.

7. A picture image processing system according to claim 3, further including means for storing in said batch parameter file associated with each of the picture image datafiles a plurality of batch characteristic parameters for the associated batch of original documents, and wherein said deleting means selectively deletes from said storing means picture image datafiles having the same retention priority based on one or more of said batch characteristic parameters.

8. A picture image processing system according to claim 1, wherein said assigning means comprises a job control sheet associated with each of the batches of documents, said job control sheet including a retention priority field for indicating the storage retention priority of the picture image datafile associated with the batch of original documents associated with said job control sheet, and wherein said storage retention priority indicates the degree of importance of the corresponding batch of documents.

9. A picture image processing system according to claim 1, wherein said assigning means comprises a job control sheet associated with each of the batches of documents, said job control sheet including a retention priority field for indicating the storage retention priority of the picture image datafile associated with the batch of original documents associated with said job control sheet, and wherein said storage retention priority indicates the degree of difficulty of generating said picture image datafile from the corresponding batch of documents.

10. A picture image processing system for entering batches of original documents to provide corresponding picture image datafiles corresponding to each of the batches of original documents comprising:
   means for storing the picture image datafiles;
   means for assigning a storage retention priority to each of said stored picture image datafiles, said storage retention priority being one of a plurality of levels from a highest retention priority to a lowest retention priority;
   means for identifying said image datafiles having the lowest retention priority; and
   deleting means for deleting from said storing means said picture image datafiles identified by said identifying means as having the lowest retention priority.

11. A picture image processing system according to claim 10, wherein said assigning means comprises a job control sheet associated with each of the batches of documents, said job control sheet including a retention priority field for indicating the storage retention priority of the picture image datafile corresponding to the batch of original documents associated with said job control sheet.

12. A picture image processing system according to claim 11, further including an optical scanner for scanning the batches of original documents to generate the corresponding picture image datafiles and the job control sheets associated with said scanned batches of original documents to generate a batch parameter file associated each of said picture image datafiles.

13. A picture image processing system according to claim 12, further including means for storing in said batch parameter file associated with each of the picture image datafiles a file creation time corresponding to the time that the associated picture image datafile was first stored in the storing means and a number of sheets of the associated picture image datafile that have been printed by an output printing means, and wherein said deleting means further deletes picture image datafiles having a selected priority from the storing means based on any one of said file creation time and the number of sheets of the associated picture image datafile printed by the output printing means.

14. A picture image processing system according to claim 12, further including means for storing in said batch parameter file associated with each of the picture image datafiles a file creation time corresponding to the time that the associated picture image datafile was first stored in the storing means, and wherein said deleting means further deletes picture image datafiles having a selected priority from the storing means based on said file creation time.

15. A picture image processing system according to claim 12, further including means for storing in said batch parameter file associated with each of the picture image datafiles the number of sheets of the associated picture image datafile that have been printed by an output printing means, and wherein said deleting means further deletes picture image datafiles having a selected priority from the storing means based on the number of sheets of the associated picture image datafile printed by the output printing means.

16. A picture image processing system according to claim 12, further including means for storing in said batch parameter file associated with each of the picture image datafiles a plurality of batch characteristic parameters for the associated batch of original documents, and wherein said deleting means selectively deletes from said storing means picture image datafiles having the same retention priority based on one or more of said batch characteristic parameters.

17. A picture image processing system according to claim 10, wherein said assigning means comprises a job control sheet associated with each of the batches of documents, said job control sheet including a retention priority field for indicating the storage retention priority of the picture image datafile associated with the batch of original documents associated with said job control sheet, and wherein said storage retention priority indicates the degree of importance of the corresponding batch of documents.

18. A picture image processing system according to claim 10, wherein said assigning means comprises a job control sheet associated with each of the batches of documents, said job control sheet including a retention priority field for indicating the storage retention priority of the picture image datafile associated with the batch of original documents associated with said job control sheet, and wherein said storage retention priority indicates the degree of difficulty of generating said picture image datafile from the corresponding batch of documents.

19. A picture image processing system according to claim 10, further including:
   a job control sheet associated with each of the batches of documents, said job control sheet for indicating job parameters for said associated batch of original documents;
   a document feeding unit for feeding said batches of original documents and said job control sheets associated therewith;
   a document reading unit for scanning said original documents fed by said document feeding unit to produce said associated picture image datafiles and for scanning said job control sheets to produce corresponding job parameter datafiles;
   user interface means for entering system control instructions; and external input equipments for entering other datafiles, said other datafiles being stored by said storing means; and memory means for storing said job parameter datafiles and said system control instructions.

20. A picture image processing system for inputting picture image data and job parameters associated with the picture image data to define instructions for processing the picture image data into picture image datafiles and for outputting the picture image datafiles comprising:

means for temporarily storing the picture image data and the job parameters;

means responsive to the job parameters for processing the picture image data to form picture image datafiles;

means for storing the picture image datafiles;

means for setting system threshold parameters relating to a deletion of picture image datafiles from said storing means;

means for deciding whether the job parameters associated with the stored picture image datafiles are within said system threshold parameters; and means for deleting picture image datafiles and associated job parameters from the storing means when the job parameters are outside of the system threshold parameters.

21. A picture image processing system according to claim 20, further including assigning means for entering into said job parameters associated with said picture image datafiles a retention priority for indicating the storage retention priority of the picture image datafiles associated with said job parameters, said storage retention priority being one of a plurality of levels from a highest retention priority to a lowest retention priority depending on one or more of a file creation time corresponding to the time that the associated picture image datafile was first stored in the storing means, a number of sheets of the associated picture image datafile that have been printed by an output printing means, and an amount of available storage in the storing means.

22. A picture image processing system according to claim 21, wherein said deleting means deletes picture image datafiles and associated job parameters from the storing of a selected retention priority responsive to an application of power to the image processing system.

23. A picture image processing system according to claim 20, further including means for assigning a file retention priority to each of said picture image datafiles according to the degree of importance of said picture image datafile, and wherein said deleting means deletes said picture image datafiles and said corresponding job parameters from said storing means in accordance with said file retention priority.

24. A picture image processing system according to claim 20, further including means for assigning a file retention priority to each of said picture image datafiles according to the degree of difficulty of generating said picture image datafiles, and wherein said deleting means deletes said picture image datafiles and said corresponding job parameters from said storing means in accordance with said file retention priority.

* * * * *